Patented Sept. 20, 1932

1,878,471

UNITED STATES PATENT OFFICE

KARL DOBMAIER, OF WIESDORF, GERMANY, ASSIGNOR TO GENERAL ANILINE WORKS, INC., OF NEW YORK, N. Y., A CORPORATION OF DELAWARE

AZO DYESTUFF

No Drawing. Application filed August 9, 1928, Serial No. 298,620, and in Germany August 20, 1927.

The present invention relates to new azodyestuffs, more particularly it relates to dyestuffs of the probable general formula:

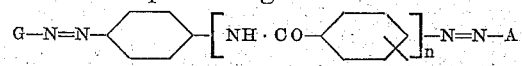

wherein G means the residue of a "yellow component," of the group consisting of pyrazolones, phenols, phenol alkyl ethers, phenol-o-carboxylic acids and aceto acetic acid arylamides; n stands for one of the numbers 1 and 2 and A stands for the residue of a coupling component of the group including aminonaphthol sulfonic acids which are substituted in the amino group by an amino-aroyl residue, pyrazolones of the general formula:

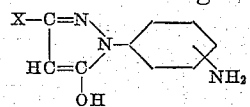

(X meaning $CH_3$, COOH or COO·alkyl)

and heterocyclic compounds possessing two carbon atoms in common with a naphthol sulfonic acid, the heterocyclic ring being substituted by the group

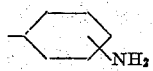

The manufacture of such azo dyestuffs may be performed for instance by coupling the diazo compound of a nitroaroylated diamine or of a derivative thereof with a "yellow component," as hereinafter described, reducing the nitro group of the monoazo dyestuff, diazotizing and coupling with one of the compounds mentioned above under letter A. As a modification in this manufacture the process may be carried out by coupling the diazo compound of a nitroaroylated diamine or of a derivative thereof with a "yellow component," reducing the nitro group of the monoazo dyestuff, condensing with a nitrobenzoyl chloride or a derivative thereof, reducing, diazotizing and then coupling with one of the compounds mentioned above under letter A. Alternatively the diazo compound of a nitramine or of a derivative thereof is coupled with a "yellow component," the monoazo dyestuff reduced, condensed with nitrobenzoyl chloride and again reduced, (the condensation with nitrobenzoyl chloride and subsequent reduction being repeated, if desired), after which the monoazo dyestuff is diazotized and further treated as described above. Instead of using the nitro or nitroaroyl compounds of amines or diamines, as the primary compounds, the acylamino compounds can be employed, in which case saponification of the amine will be necessary instead of the reduction of the nitro group.

As "yellow components" i. e. coupling components by means of which yellow to brown azo dyestuffs are obtainable when using them as end-components, may be mentioned, phenylmethylpyrazolones, 1-phenyl-3-carboxyl-(carbethoxy) pyrazolones, phenols, (alkylated phenols) phenol carboxylic acids, acetoacetic acid anilides and the like. As compounds mentioned under letter A in the declaration of the first formula may be mentioned, meta or para aminobenzoyl-2:5:7-aminonaphthol sulfonic acid meta or para aminobenzoyl-2:6:8-aminonaphthol sulfonic acid, meta or para aminobenzoylamino-meta or para benzoyl-2-amino-5-hydroxynaphthalene-7-sulfonic acid, meta or para aminophenyl-1:2-naphthimidazol-5-hydroxy-7-sulfonic acid, meta or para aminomethoxyphenyl-1:2-naphthimidazol-5-hydroxy-7-sulfonic acid, meta or para aminophenyl-1:2-naphthothiazol-5-hydroxy-7-sulfonic acid, meta or para aminophenylmethylpyrazolone, 3'—(or 4'—)-amino-1-phenyl-3-carboxy-(carbethoxy) pyrazolone and the like.

The new dyestuffs, thus obtainable form yellow to brown powders, difficultly soluble in the usual organic solvents, soluble in water in form of their alkali metal salts, yielding on cotton clear yellow to brown dyeings. The dyestuffs are capable of being developed with coupling components, as for instance β-naphthols, pyrazolones "e. a." after having been rediazotized either in substance or on the fibre.

The following examples illustrate my invention without limiting it thereto:—

*Example 1*

55 parts by weight of metanitrobenzoyl para phenylene diamine sulfonic acid are diazotized in the known manner and coupled at 15–20° C. in the presence of sodium carbonate with 78 parts by weight of phenylmethyl-pyrazolone sulfonic acid. The yellow monoazo dyestuff is filtered, made into a paste with water and reduced with 60 parts by weight of sodium sulfide at 60° C. in the course of 2 hours. The solution is then neutralized, the amino compound is salted out and purified by re-dissolving.

This product is diazotized at 15–20° C., coupled in the presence of sodium carbonate with 36 parts by weight of meta aminophenyl-methylpyrazolone and isolated by salting out. The resulting dyestuff, when in the dry state, forms a yellowish brown powder, which dissolves in water with an orange yellow coloration and dyes cotton yellow. Development with β-naphthol yields a clear orange and development with pyrazolone a clear yellow.

*Example 2*

By effecting in Example 1 the coupling in caustic soda solution at 25–30° C. using 20 parts by weight of salicylic acid as the first coupling component, instead of phenyl-methyl pyrazolone sulfonic acid and proceeding thereafter in the same manner as in Example 1, reddish orange to yellow shades are obtained.

*Example 3*

55 parts by weight of para nitrobenzoyl para phenylene diamine sulfonic acid are diazotized in the known manner and coupled at 20° C. with 78 parts by weight of phenyl-methyl pyrazolone sulfonic acid in the presence of sodium carbonate. The yellow dyestuff is filtered, made into a paste with water, reduced with 60 parts by weight of sodium sulfide at 60° C. in the course of 2 hours and isolated as in Example 1. This intermediate product is dissolved in water with the addition of a little sodium carbonate and condensed with meta nitrobenzoyl chloride, which is slowly introduced at 60° C. in the presence of sodium carbonate until a test portion no longer absorbs any nitrite. The resulting nitro compound is isolated by salting out, re-dissolved in water, reduced with 55 parts by weight of sodium sulfide at 60° C. in the course of 2 hours, isolated by neutralization and salting out and purified by re-dissolving. The yellow paste thus obtained is re-dissolved in water, diazotized in the customary manner and coupled in the presence of sodium carbonate with 24 parts by weight of para amino-methyl-phenylpyrazolone. The dyestuff thus obtained probably corresponds in its free form to the formula

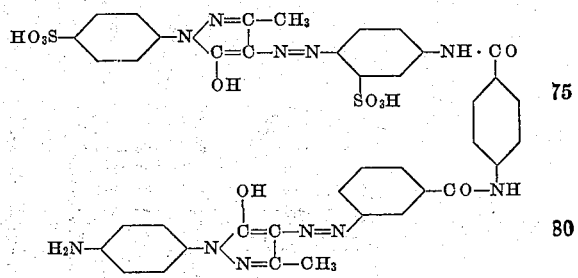
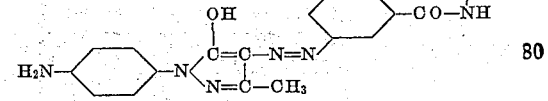

It forms a yellow powder, easily soluble in water in form of its alkali metal salts, dyeing cotton a clear yellow. Development with β-naphthol yields a clear yellowish orange and development with phenylmethylpyrazolone a greenish yellow.

*Example 4*

By employing in Example 3, 38 parts by weight of para aminobenzoyl-2:5:7-aminonaphthol sulfonic acid as the end component instead of the para aminophenyl methylpyrazolone, an orange is obtained on cotton, which developed with β-naphthol changes to a bluish orange and with pyrazolone to a yellowish orange.

I claim:—

1. The azo dyestuff having in its free form the probable formula

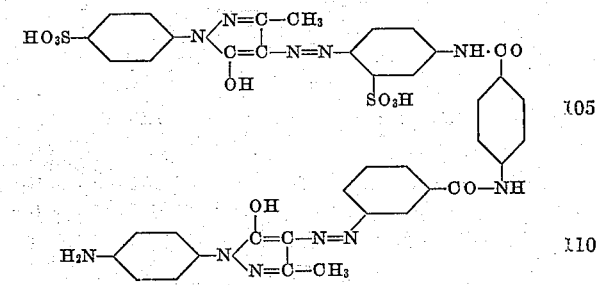
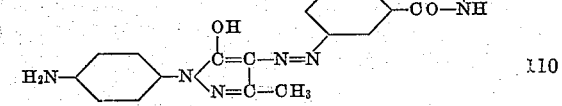

said dyestuff being a yellow powder easily soluble in water in form of its alkali metal salts, dyeing cotton a greenish yellow shade, which when diazotized and developed with β-naphthol yields a clear yellowish orange.

2. New azo dyestuffs of the probable general formula:

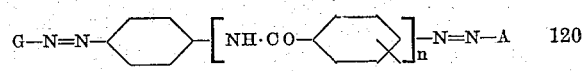

wherein G means the residue of a "yellow component" of the group consisting of pyrazolones, phenols, phenol alkyl ethers, phenol-o-carboxylic acids and aceto acetic acid arylamides, n stands for one of the numbers 1 and 2 and A stands for the residue of a coupling component of the group consisting of amino-naphthol sulfonic acids which are substituted in the amino group by an amino-aroyl residue, pyrazolones of the general formula:

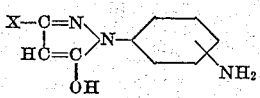

(X meaning CH₃, COOH or COO·alkyl)

and heterocyclic compounds possessing two carbon atoms in common with a naphthol sulfonic acid, the heterocyclic ring being substituted by the group

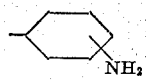

said dyestuffs being yellow to brown powders difficultly soluble in the usual organic solvents, soluble in water in form of their alkali metal salts, yielding on cotton clear yellow to brown dyeings and being capable of development with azo components after having been diazotized.

3. New azo dyestuffs of the probable general formula:

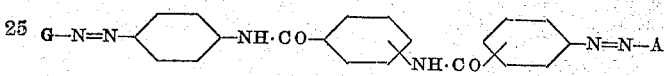

wherein G means the residue of a "yellow component" of the group consisting of pyrazolones, phenols, phenol alkyl ethers, phenol-o-carboxylic acids and aceto acetic acid arylamides and A stands for the residue of a coupling component of the group consisting of amino-naphthol sulfonic acids which are substituted in the amino group by an amino-aroyl residue, pyrazolones of the general formula:

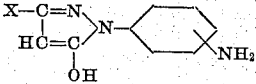

(X meaning CH₃, COOH or COO·alkyl)

and heterocyclic compounds possessing two carbon atoms in common with a naphthol sulfonic acid, the heterocyclic ring being substituted by the group

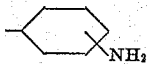

said dyestuffs being yellow to brown powders difficultly soluble in the usual organic solvents, soluble in water in form of their alkali metal salts, yielding on cotton clear yellow to brown dyeings and being capable of development with azo components after having been diazotized.

4. New azo dyestuffs of the probable general formula:

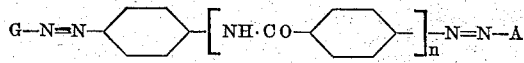

wherein G means the residue of a "yellow component" of the group consisting of pyrazolones, phenols, phenol alkyl ethers, phenol-o-carboxylic acids and aceto acetic acid arylamides, $n$ stands for one of the numbers 1 and 2 and A stands for the residue of a coupling component of the group consisting of amino-naphthol sulfonic acids which are substituted in the amino group by an aminobenzoyl residue, pyrazolones of the general formula:

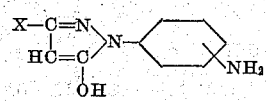

(X meaning CH₃, COOH, COO·C₂H₅)

and heterocyclic compounds of the general formula:

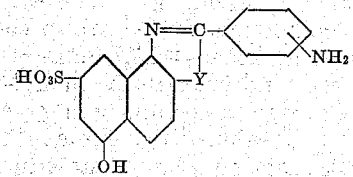

(Y meaning S or NH)

said dyestuffs being yellow to brown powders difficultly soluble in the usual organic solvents, soluble in water in form of their alkali metal salts, yielding on cotton clear yellow to brown dyeings and being capable of development with azo components after having been diazotized.

5. New azo dyestuffs of the probable general formula:

G—N=N—⟨ ⟩—NH·CO—⟨ ⟩—NH·CO—⟨ ⟩—N=N—A wherein G means the residue of a "yellow component" of the group consisting of pyrazolones, phenols, phenol alkyl ethers, phenol-o-carboxylic acids and aceto acetic acid arylamides and A stands for the residue of a coupling component of the group consisting of amino-naphthol sulfonic acids which are substituted in the amino group by an aminobenzoyl residue, pyrazolones of the general formula:

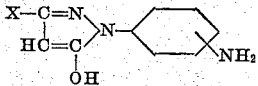

(X meaning CH₃, COOH, COO·C₂H₅)

and heterocyclic compounds of the general formula:

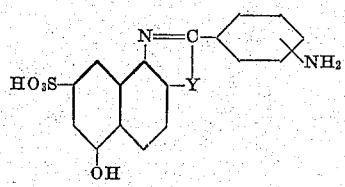

(Y meaning S or NH)

said dyestuffs being yellow to brown powders difficultly soluble in the usual organic solvents, soluble in water in form of their alkali metal salts, yielding on cotton clear yellow to brown dyeings and being capable of development with azo components after having been diazotized.

6. New azo dyestuffs of the probable general formula:

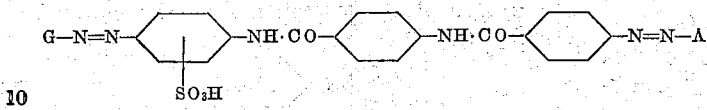

wherein G means a residue of a "yellow component" of the group consisting of pyrazolones, phenols, phenol alkyl ethers, phenol-o-carboxylic acids and aceto acetic acid arylamides and A stands for the residue of a coupling component of the group consisting of para-amino-benzoyl-2,5,7-amino-naphthol sulfonic acid and para-aminophenyl-methyl-pyrazolone; said dyestuffs being yellow to brown powders difficultly soluble in the usual organic solvents, soluble in water in form of their alkali metal salts, yielding on cotton clear yellow to brown dyeings and being capable of development with azo components after having been diazotized.

In testimony whereof I have hereunto set my hand.

KARL DOBMAIER.